United States Patent

[11] 3,597,657

| | | |
|---|---|---|
| [72] | Inventor | Bo G. Fredricsson<br>San Francisco, Calif. |
| [21] | Appl. No. | 807,669 |
| [22] | Filed | Mar. 17, 1969 |
| [45] | Patented | Aug. 3, 1971 |
| [73] | Assignee | Lynch Communication Systems, Inc.<br>San Francisco, Calif. |

[54] CURRENT LIMITER FOR POWER SUPPLIES
4 Claims, 3 Drawing Figs.

[52] U.S. Cl. .................................................. 317/22,
317/33 VR, 323/9
[51] Int. Cl. .................................................. H02h 9/02
[50] Field of Search.......................................... 323/4, 9,
22; 317/33 VR, 22

[56] References Cited
UNITED STATES PATENTS
| | | | |
|---|---|---|---|
| 3,074,006 | 1/1963 | Klees............................ | 323/9 |
| 3,131,344 | 4/1964 | Rosenfeld et al. ............ | 317/33 X |

*Primary Examiner*—James D. Trammell
*Attorney*—Mellin, Moore & Weissenberger

ABSTRACT: A self-resetting current limiter for power supplies achieves control of large currents with low-dissipation transistors by providing a normally saturated transistor in series with the load. A control transistor whose base is connected to sense any overload-caused drop across the saturated transistor controls the base potential of the series transistor in such a manner as to bias the series transistor into a current-limiting condition by a snap action as soon as an overload occurs. The resulting additional drop across the series transistor locks the control transistor in the current-limiting control condition. When a decrease in load increases the load voltage to a level sufficient to unlock the control transistor, the series transistor snaps back into its normal condition. The parameters of the circuit can be made such that release of the control transistor cannot occur until the load is well below the overload tripping level.

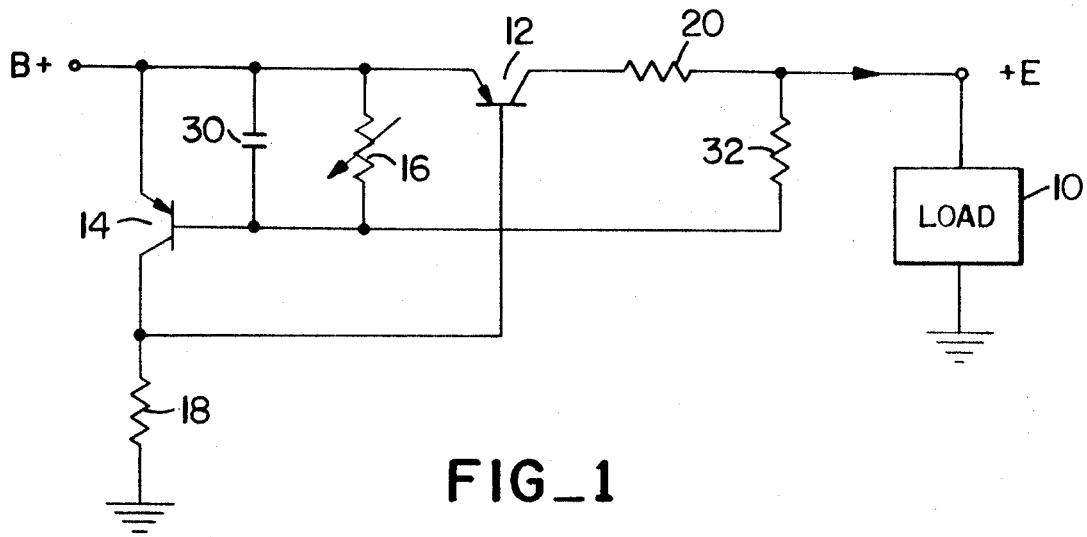
FIG_1
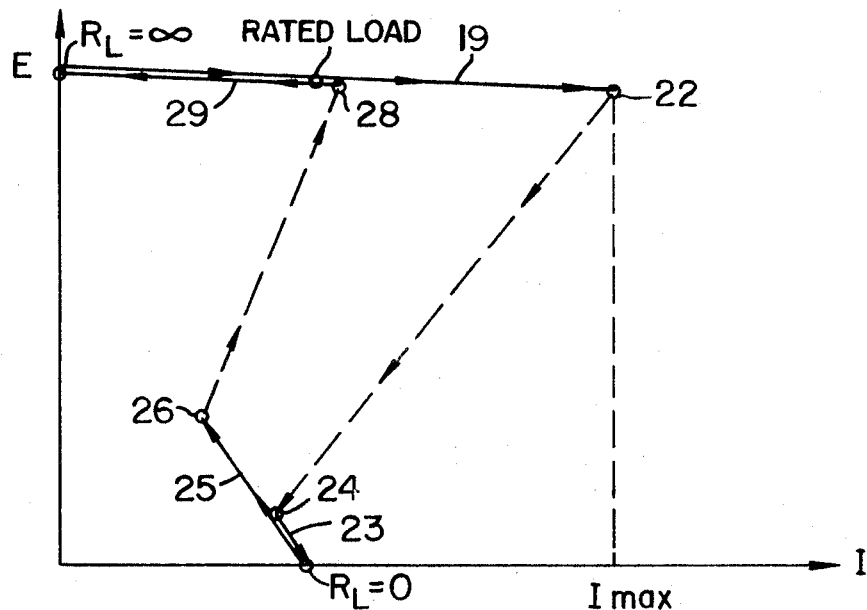
FIG_3
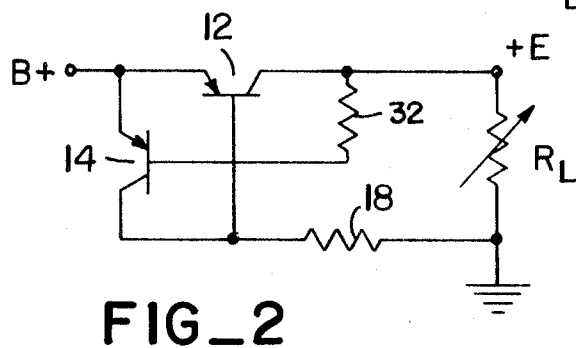
FIG_2
INVENTOR.
BO G. FREDRICSSON
BY
Mellin, Moore + Weissenberger
ATTORNEYS

CURRENT LIMITER FOR POWER SUPPLIES

BACKGROUND OF THE INVENTION

Power supplies for electronic equipment, such as telephone equipment, are normally protected against overload by some type of lockout equipment which disconnects the power supply when an overload occurs. Common such types of equipment includes fuses, regulators with a lockout feature which can be remotely cancelled when overloaded and have to be restarted.

Inasmuch as overloads frequently occur due to transient conditions, it is desirable to restore the power supply automatically as soon as the overload condition has been removed. Circuits capable of accomplishing this result are known, but their complexity has thus far prevented their use except in special circumstances.

SUMMARY OF THE INVENTION

The circuit of this invention solves the problem of economically providing self-restoring overload control in a novel manner. Instead of cutting the power off completely when an overload occurs, the circuit switches itself into a mode in which even a total short circuit can draw no more than a safe amount of current from the power source. In this limited current mode, the circuit is capable of sensing a load reduction to within permissible operating limits, and restoring itself to normal operation in response thereto.

The circuit of this invention accomplishes this result, basically, by the use of two low-dissipation transistors and one resistor. For practical purposes, however, it is desirable to add a few additional components for refinement and adjustment of the overload response as will be hereinafter explained.

Essentially, the circuit functions by maintaining a saturated condition in a transistor whose emitter-collector circuit is connected in series with the load. When an overload causes the series transistor to become unsaturated, the resulting voltage drop across it biases a control transistor into conduction. The control transistor effectively shorts out the base-emitter circuit of the series transistor, thereby not only imposing a current limit on the series transistor, but also locking itself in.

When the load subsequently drops to an amply safe level, the control transistor bias reaches the cutoff level. At this point, the series transistor again becomes saturated, the control transistor cuts off completely, and the circuit snaps back to its normal operating condition.

Due to its saturated condition, the series transistor dissipates no power during normal operation, and hence a low-dissipation transistor can be used to control power levels many times higher than its dissipation rating.

BRIEF DESCRIPTION OF THE DRAWING

FIG. 1 is a diagram of the self-restoring power supply current limiter of this invention;

FIG. 2 is a diagram illustrating the basic functional components and relationships involved in carrying out the concept of the invention; and FIG. 3 is a graphic representation of the load current vs. the load voltage for a variation of the load resistance from infinity to zero and back to infinity.

DESCRIPTION OF THE PREFERRED EMBODIMENT

FIG. 1 illustrated a practical embodiment of the invention for the overload protection of a power supply B+ which provides the power for a load 10. The load current is controlled by a series transistor 12 which may be, for example, a ¼-watt NPN transistor if the load 10 is on the order of two or more watts. Control is effected by a control transistor 14, and the response level of the circuit can be adjusted by a variable resistor 16.

The functioning of the circuit is vest explained by reference to FIG. 2. In that figure, the basic elements of the circuit are seen to be the transistors 12, 14, and the bias resistor 18.

During normal operation of the circuit, control transistor 14 is cut off because its base-emitter circuit is effectively shorted out by the emitter-collector circuit of series transistor 12. With no significant current flowing through the emitter-collector circuit of control transistor 14, the base of series transistor 12 is at a potential of B+ minus the base-emitter drop of transistor 12, and series transistor 12 is maintained in a saturated condition, i.e., its emitter-collector drop is essentially zero.

When the load resistance $R_L$ decreases to the danger point, the series transistor 12 eventually reaches a point where it is no longer saturated, and the resultant emitter-collector drop in transistor 12 causes the potential at the base of control transistor 14 to drop. Control transistor 14 thereupon begins to conduct, and the resulting current flow through bias resistor 18 raises the potential of the base of series transistor 12.

The reduction of the series transistor bias intensifies the effect of the emitter-collector drop in transistor 12, and the circuit snaps into a condition in which control transistor 14 is saturated and shorts out the base-emitter circuit of series transistor 12. Resistor 32 limits the base-emitter current of transistor 12.

In this condition, the current which can flow through the emitter-collector circuit of series transistor 12 is limited to a value well below the dissipation capabilities of transistor 12. Some current does continue to flow, however, and the magnitude of this current is dependent upon the value of the load resistance $R_L$.

As $R_L$ increases (i.e., the load diminishes), the load current (and hence the drop across transistor 12) diminishes while the drop across the load increases. Eventually, the circuit reaches a point where the base current of control transistor 14 drops below saturation level and begins to cut control transistor 14 off. The base potential of series transistor 12 immediately starts to drop, the emitter-collector drop in series transistor 12 diminishes, the base current of control transistor 14 drops even more, and the circuit snaps back to the normal operating condition.

The operation of the circuit is graphically shown in FIG. 3. In that diagram, the open-circuit no-load) condition of the circuit is shown at $R_L=\infty$. At this point, the load voltage E is at a maximum, and the load current I is zero. With $R_L$ decreasing to the rated load point along line 19, and the corresponding increase in load current, there is a slight drop in the load voltage E, due mainly to the action of current sensing resistor 20 (FIG. 1), whose function is discussed below.

With a further decrease in $R_L$ along line 19, the load current eventually reaches its maximum value $I_{max}$ at point 22 in FIG. 3. At this point, the circuit snaps into its limited-current condition, and both the load voltage and the load current drop drastically and suddenly to the values of point 24. A still further decrease in $R_L$ along line 23 to the short circuit condition $R_L=0$ results in a small load current increase as the load voltage drops to zero.

When the short circuit is removed and $R_L$ increases again along line 25, the limited-current condition of the circuit continues past point 24 until, at point 26, the load voltage reaches a sufficiently high value to cause the circuit to snap back to its normal condition at point 28 which, for self-restoration of the circuit, has to correspond to a load slightly greater than the rated load.

Further reduction of the load along line 29 to the open circuit condition of $R_L=\infty$ causes the voltage-current curve to retrace the normal condition-increasing current line 19. It will be understood that lines 19 and 29 are actually superimposed upon one another and are drawn separately in FIG. 3 only for the sake of clarity. The same is true for lines 23 and 25.

Coming back now to FIG. 1, it will be seen that the preferred circuit of FIG. 1 is the same circuit as that of FIG. 2, but with some refinements added.

Transient protection is provided by a bypass capacitor 30 which prevents the circuit from responding to transients of sufficiently short duration to make overload protection of the power supply unnecessary.

Current-sensing resistor 20 is added to produce a drop proportional to the load current so as to allow adjustment of $I_{max}$. The resistor 20 is of very low value, typically perhaps on the order of 0.3 ohm.

In view of the fact that resistors of sufficiently low value are not routinely available as stock items, and that a considerably larger resistor can normally be used without creating excessive drop or power dissipation, a voltage divider 16, 32 is provided to reduce the effect of the drop across current-sensing resistor 20 on the base of control transistor 14. In this manner, a stock component such as, e.g., a 10-ohm resistor can conveniently be used for resistor 20. The voltage-divider function of resistor 32 does not detract from its primary function as a base drive limiter for control transistor 14 to prevent burnout of the base-emitter junction of transistor 14.

The overload cutoff current $I_{max}$ can be adjusted by varying the resistance $R_{16}$ of resistor 16. With $R_{16} = 0$, the circuit will not cut off at all; with $R_{16} = \infty$, the circuit will cut off at a low value of I determined essentially by the resistance of load current sensing resistor 20.

In the basic circuit of FIG. 2, it will be seen that $$I_{max} = \beta_{12} E_c / R_{18} \quad (1)$$

where $\beta_{12}$ is the beta (collector current-to-base current ratio) of series transistor 12, $E_c$ is the load voltage at cutoff, and $R_{18}$ is the resistance of bias resistor 18. Therefore, in the basic circuit, the cutoff load current $I_{max}$ can be adjusted by varying $R_{18}$.

By comparison, in the circuit of FIG. 1, it will be readily seen that, neglecting the small effect of the transistor betas, $$I_{max} = V_{BE14} - R_{20} \quad (2)$$

where $V_{BE}$ is the base-emitter drop of transistor 14 and $R_{20}$ is the resistance of resistor 20. Therefore, with resistor 16 in the circuit, $$I_{max} = \frac{V_{BE14}}{R_{20}} \times \frac{R_{32} + R_{16}}{R_{16}} \quad (3)$$

where $R_{16}$ and $R_{32}$ are the respective resistances of the voltage divider resistors 16, 32.

Certain relations must be maintained between the various resistors of FIG. 1 for the circuit to function. For the purposes of analysis, it will be recalled the $R_{20}$ is small. Furthermore, in the circuit of FIG. 1, $R_{18}$ must be smaller than $\beta_{12} R_{L22}$, where $R_{L22}$ is the load resistance at cutoff.

With these assumptions, the following equations apply for $R_{16} = \infty$:

$$\frac{R_{L22}}{R_{20}} = \frac{E_B - V_{BE14}}{V_{BE14}} \quad (4)$$

and $$\frac{E_B}{R_{18} \cdot \beta_{14}} = \frac{E_B - V_{BE14}}{R_{32} + R_{L26}} \quad (5)$$

in which $E_B$ is the potential of the B +supply, $\beta_{14}$ is the beta of transistor 14, and $R_{L26}$ is the load resistance at which the circuit returns to its normal condition when an overload is removed.

Solving for $V_{BE14}/E_B$, equations (4) and (5) become, respectively, $$\frac{V_{BE14}}{E_B} = \frac{R_{20}}{R_{20} + R_{L22}} \quad (6)$$

and $$\frac{V_{BE14}}{E_B} = 1 - \frac{R_{32} + R_{L26}}{R_{18} \cdot \beta_{14}} \quad (7)$$

The limit parameters of the circuit are those which reduce the hysteresis of FIG. 3 to zero. At zero hysteresis, $$R_{L22} = R_{L26} = R_L \quad (8)$$

in which $R_L$ is the load resistance at $I_{max}$ in a no-hysteresis condition. In that condition, equations (6) and (7) yield $$\frac{R_{20}}{R_{20} + R_L} = 1 - \frac{R_{32} + R_L}{R_{18} \cdot \beta_{14}} \quad (9)$$

or $$R_{32} = R_{18} \beta_{14} \left(1 - \frac{R_{20}}{R_{20} + R_L}\right) - R_L \quad (10)$$

However, $R_{18}\beta_{14}$ is much larger than $R_L$. Therefore, and because $R_{20}$ is small compared to $R_L$, equation (10) can be reduced to $$R_{32} \approx R_{18}\beta_{14} \quad (11)$$

Therefore, in order for the circuit of FIG. 1 to operate as described, $R_{32}$ must be smaller than $R_{18}\beta_{14}$. For practical purposes, a good design is achieved when $R_{32}$ and $R_{18}$ are of the same order of magnitude.

Considering that, as stated above, $$R_{18} < \beta_{12} R_{L22} \quad (12)$$

the relation for the no-hysteresis condition is $$R_{18} < \beta_{12} R_L \quad (13)$$

which can be written $$R_{18}\beta_{14} < \beta_{12}\beta_{14} R_L \quad (14)$$

Considering further that, as stated above, $$R_L << R_{18}\beta_{14} \quad (15)$$

it will be true that $$R_L << R_{18}\beta_{14} < \beta_{12}\beta_{14} R_L \quad (16)$$

or $$\frac{1}{\beta_{14}} << \frac{R_{18}}{R_L} < \beta_{12} \quad (17)$$

It is desirable to make $R_{18}$ large to reduce the power-wasting base current of transistor 12 during normal operation to the minimum necessary to sustain the load current. However, with the upper limit set by expression (17) in mind, a practical figure for good design is $R_{18} \approx 10 R_L$.

I claim:

1. A current-limiting circuit for power supplies, comprising:
   a. a power source;
   b. a load;
   c. a first transistor having its emitter-collector circuit connected in series with said load;
   d. a second transistor having its emitter-collector circuit connected directly in parallel with the base-emitter circuit of said first transistor;
   e. the base-emitter circuit of said second transistor being connected substantially directly in parallel with the emitter-collector circuit of said first transistor;
   f. whereby said first and second transistors, when conducting, essentially short out each other's base-emitter circuit;
   g. base drive limiting resistor means interposed in said base-emitter circuit of said second transistor;
   h. the resistance $R_d$ of said base drive limiting resistor means being smaller than the value $\beta_2 R_b$, wherein $\beta_2$ is the beta of said second transistor, and $R_b$ is the resistance of said bias resistor means, so as to provide a switching hysteresis in which the load current, as the load resistance goes toward zero, suddenly drops from a limit value to a substantially lower value and then increases again to a final value less than said limit valve, said load current, as said load resistance increases again, diminishing until it suddenly jumps to a higher value less than said limit value;
   i. whereby tripping of the circuit is prevented until the overload is substantial, yet restoration of normal operation of the circuit is prevented until the load returns to near normal.

2. The circuit of claim 1, further comprising current sensing resistor means connected in the portion of the circuit common to the base-emitter circuit of said second transistor and the emitter-collector circuit of said first transistor.

3. The circuit of claim 2, further comprising limits setting resistor means connected between said power source and the base of said second transistor for determining said limit value of said load current independently of said current sensing resistor means.

4. The circuit of claim 3, in which said limits setting resistor means is adjustable.